United States Patent

[15] 3,647,423

Acoveno [45] Mar. 7, 1972

[54] PRODUCTION OF COPPER, NICKEL OXIDE AND ZINC OXIDE

[72] Inventor: Floyd Acoveno, c/o Southern Lead Co., P. O. Box 6195, Dallas, Tex. 75222

[22] Filed: Oct. 27, 1969

[21] Appl. No.: 869,782

[52] U.S. Cl. ................75/103, 75/108, 75/117, 75/119, 75/120, 23/147, 23/183, 23/61
[51] Int. Cl. .............C22b 15/10, C22b 19/24, C22b 23/04
[58] Field of Search ..................75/117, 72, 119, 120, 103, 75/108, 101, 0.5 A; 23/147, 61, 183, 193, 305

[56] References Cited

UNITED STATES PATENTS

| | | | |
|---|---|---|---|
| 3,186,833 | 6/1965 | Cech | 75/103 X |
| 2,155,119 | 4/1939 | Ebner | 23/183 X |
| 3,141,765 | 7/1964 | Brown et al. | 75/103 |
| 2,585,185 | 2/1952 | Supiro | 75/117 X |
| 1,508,243 | 9/1924 | Perkins et al. | 75/72 |
| 2,647,830 | 8/1953 | Allen et al. | 75/103 |
| 1,131,986 | 3/1915 | Benedict | 75/117 X |
| 1,608,844 | 11/1926 | Edwards et al. | 75/103 |
| 3,492,115 | 1/1970 | Mahalla | 75/103 |

Primary Examiner—L. Dewayne Rutledge
Assistant Examiner—G. T. Ozaki
Attorney—Pennie, Edmonds, Morton, Taylor and Adams

[57] ABSTRACT

High-purity copper powder, nickel powder and zinc powder, high-purity oxides of these metals and high-purity carbonates of these metals are recovered from copper-, nickel- or zinc-bearing materials by leaching the material with an aqueous ammonia-ammonium carbonate solution at an elevated temperature and under a partial pressure of oxygen. The copper-, nickel- or zinc-containing leach liquor is then separated from the insoluble residue and contacted with hot gases to cause rapid decomposition of the corresponding metal ammonium carbonate solution into a gas/solids mixture. The resulting metal carbonate or metal oxide powder of high purity is then separated from the decomposition gas components and is recovered. These oxidic metal powders can be reduced with hydrogen to obtain high-purity metal powders.

16 Claims, 3 Drawing Figures

INVENTOR
Floyd A. Acoveno
BY
Pennie, Edmonds, Morton, Taylor & Adams
ATTORNEYS

PRODUCTION OF COPPER, NICKEL OXIDE AND ZINC OXIDE

BACKGROUND OF THE INVENTION

1. Field of the Invention

This invention relates to the recovery of copper from copper-bearing materials, nickel from nickel-bearing materials and/or zinc from zinc-bearing materials by subjecting said materials to an aqueous ammonia-ammonium carbonate leaching solution.

2. Description of the Prior Art

Prior art processes of recovering copper from copper-bearing materials, nickel from nickel-bearing materials and/or zinc from zinc-bearing materials involving the leaching of the metal values therefrom by use of an aqueous ammonia-ammonium carbonate leaching solution are generally operated at atmospheric pressure and low temperatures which results in low reaction rates, higher losses of ammonia and carbon dioxide and the need for additional equipment to recover these gases for economical operation. In addition, these processes involve direct distillation of the copper-, or nickel- or zinc-bearing solutions which produces copper oxide and a gas containing ammonia, carbon dioxide and steam. However, the copper oxide that forms remains in the equipment and must be removed by mechanical means. This is not only costly, but scale deposits of the copper oxide build up on the equipment and necessitates frequent shutdowns to clean the equipment.

SUMMARY OF THE INVENTION

This invention broadly comprises the leaching of a metallic copper-bearing material or nickel-bearing material or zinc-bearing material that also contains iron and other unwanted contaminants with an oxidizing aqueous leach solution containing ammonia-ammonium carbonate at an elevated temperature, advantageously under a partial pressure of oxygen, in a closed system to obtain a substantially iron-free aqueous ammonium carbonate solution of copper, nickel or zinc. Referring now, in the interest of simplicity, specifically to the production of high-purity copper products, the substantially iron-free copper-containing aqueous liquor is then contacted to treated with hot gases (for example, hot air or hot combustion gases) to cause rapid evaporation and decomposition of the copper ammonium carbonate solution into a gas/solids mixture. The copper solids, which may be copper oxide or a mixture of copper oxides and copper carbonate, are then separated from the gases containing ammonia, carbon dioxide and steam in a conventional gas/solids separator thereby producing an oxidic copper product of high purity. The gases resulting from this gas/solids separation are then recirculated and a portion thereof advantageously reheated by a gas-fired heater and used as the hot gas media that contacts additional copper ammonium carbonate leach solutions in the process. The portion of this recycled gas not used to dewater and decompose the leach solution is condensed into a liquid which is used for leaching more copper-bearing material. Thus, the entire process is carried out in a closed circuit.

The closed and pressurized leaching system according to this invention results in a number of advantages. The fact that the system is closed prevents the loss of any significant amount of the reaction gases. The pressurized leaching system also permits the leaching reaction to be carried out at elevated temperatures which in return results in significantly faster leaching rates. The gas recycle further assures proper mixing of the leaching reactants and is used to maintain the optimum ratio of cupric to cuprous ion ratio in the oxidizing leach solution. The process of this invention also results in the production of oxidic copper products (i.e., copper carbonates and/or copper oxides) of an advantageous particle size, and when these oxidic copper products are treated with a reducing agent, such as hydrogen, it produces copper powder of an advantageous and uniform size for subsequent processing. The process of this invention further is highly economical and versatile in that various types of copper products can be produced by simple alterations of the process.

DESCRIPTION OF THE PREFERRED EMBODIMENT

Figure 1:
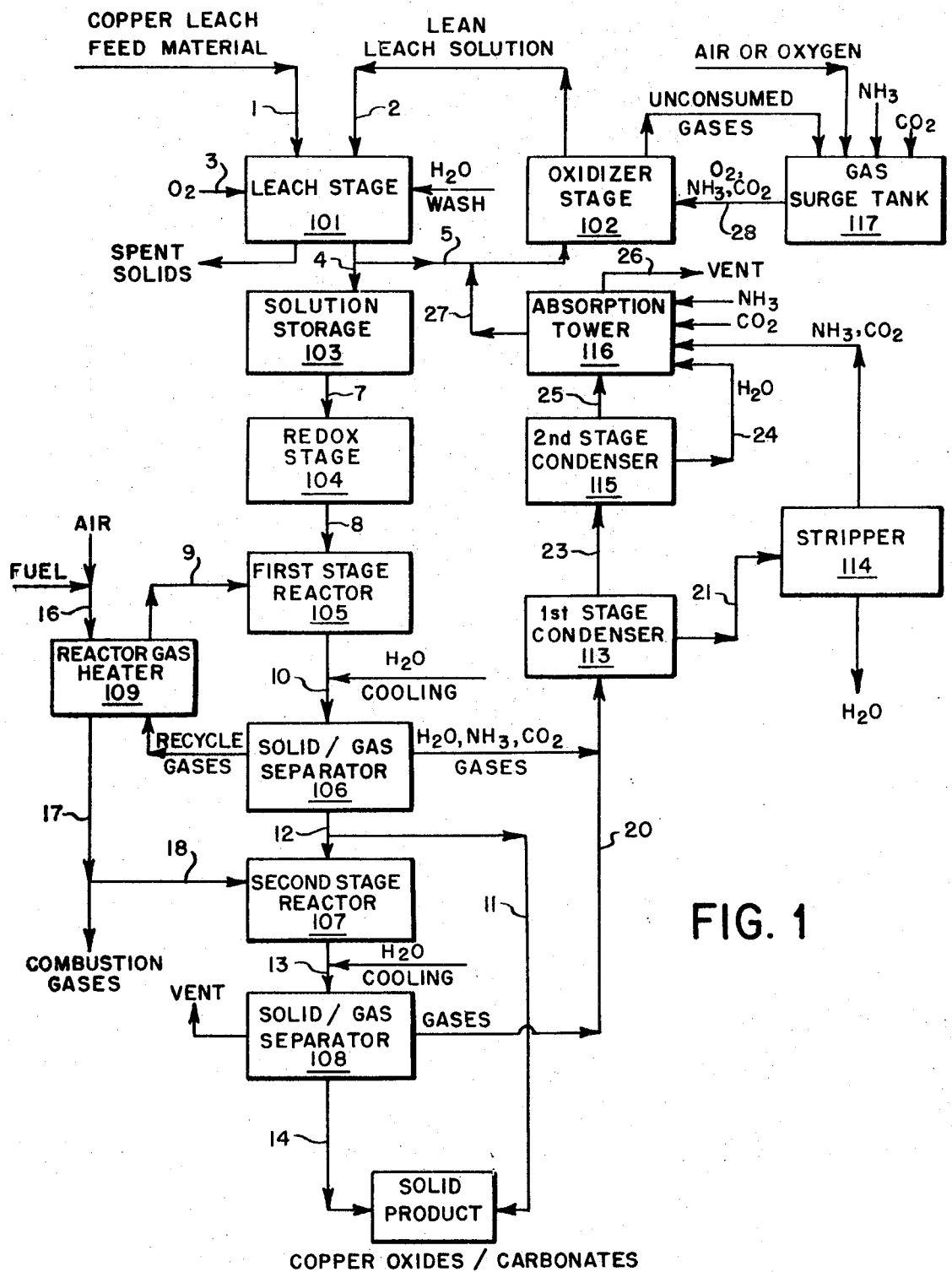
FIG. 1 is a flow sheet of an advantageous embodiment of the process of the invention in which a portion of the gaseous decomposition product is heated and recycled through the first stage reactor, this embodiment being referred to as the closed, indirect fired, heat exchange system.

The process of the present invention involves the leaching of impure copper-bearing or zinc-bearing or nickel-bearing materials to recover the copper, zinc or nickel values in the form of high-purity carbonates and/or oxides of these metals. The raw materials containing the metal being recovered is leached with an oxidizing leach solution containing ammonia-ammonium carbonate. The leach solution may also contain copper (or zinc or nickel) ammonium carbonate and advantageously also contains oxygen as the oxidizing agent. Part of the pregnant leach liquor from the leaching step of the process is recycled to the start of the leaching step after being diluted and replenished to reconstitute a further quantity of leach solution of the desired composition. The remainder of the pregnant leach liquor is brought into contact with hot gases which evaporate the water content of the liquor and decompose the metal ammonium carbonate content thereof to produce a mixture of gases comprising essentially water, ammonia and carbon dioxide and a finely divided solid product comprising essentially oxides and carbonates of copper or zinc or nickel as the case may be.

In one embodiment of the invention (referred to as the closed, indirect fired, heat exchange system) a portion of the gases from the gas/liquor reactor are heated and are then used to dewater and decompose an additional quantity of pregnant leach liquor in said reactor. The portion of the gases from the reactor that is not recycled to the reactor is condensed to recover the water, ammonia and carbon dioxide content thereof, this condensate being used in reconstituting the leach solution. In another embodiment of the invention (referred to as the open, indirect fired, heat exchange system) all of the gaseous product of the reactor is condensed, the hot gas employed in the reactor to dewater and decompose the pregnant leach liquor being hot air (or some other extraneous gas) that is introduced into the system at this point. In yet another modification of the process (referred to as the open, direct fired, heat exchange system) the hot gases employed to dewater and decompose the pregnant leach liquor comprise hot combustion gases obtained direct from a suitable combustion furnace. In all cases the solid product of the leach liquor decomposition step of the process is finely divided oxides and/or carbonates of copper, zinc or nickel.

The operation of both the "closed" and the "open" systems of the invention are described in detail below in connection with the production of copper oxides, and modifications thereof to produce different products (for example, copper powder, nickel oxide and nickel powder, and zinc oxide and zinc powder) are later described.

Copper-bearing feed materials that may be treated in the process of the invention include impure copper scrap, copper clad steel scrap, copper alloy scrap, copper concentrates and similar cupriferous materials. In the operation of the closed, indirect fired, system shown in FIG. 1 the copper-bearing feed material is shredded, crushed and/or ground to the desired size and then is charged into the leach vessel 101 through line 1. An oxidizing aqueous leach solution containing ammonia-ammonium carbonate, and advantageously comprising predominantly a lean aqueous solution of cupric ammonium carbonate or a mixture of cupric and cuprous ammonium carbonates, is fed from the oxidizer vessel 102 to the leach vessel 101 through the line 2. Oxygen is introduced into the vessel 101 through the line 3 as and if required.

The leach vessel 101 advantageously is a rotating unit of conventional construction that continuously mixes the leach solution and the copper bearing feed material, but a conventional stationary bed leach unit or a leach tank could also be used. Although only one leach vessel is disclosed in the drawing, it is advantageous to have two or more leach vessels arranged in parallel so that each can be fed lean leach solution from the oxidizer vessel 102 and so that the pregnant leach solutions therefrom can be fed directly to the oxidizer vessel 102, to the solution storage vessel 103, to the reduction stage vessel 104 or directly to the first stage reactor 105, as desired. The leaching procedure may be carried out as a batchwise or continuous operation. However it advantageously is carried out as a batch-continuous operation in which solid feed is charged batchwise into two or more leach vessels at approximately one-third the 24-hour requirements of the plant while the leach solution is continuously circulated through the solid material being leached.

The leach operation is advantageously carried out at a pressure corresponding to the equilibrium vapor pressure of the several components in the leaching solution and thus will depend on the composition of the leach solution as well as the leaching conditions and the temperature required for the copper-bearing feed material being leached. Specifically, it has been found advantageous to carry out the leaching operation at a temperature of at least about 100° F. and under partial pressure of oxygen of at least about 2 p.s.i. With copper clad steel containing 4–5 percent copper, it is advantageous to operate at a temperature of about 150° F. and at about 40 p.s.i.g. with continuous agitation or rotation during the leaching operation.

The composition and concentration of the leach solution employed will depend upon the particular copper-bearing material being leached and upon the cupric/cuprous ratio desired in the resulting pregnant leach liquor. Similarly, the residence time of both the material being leached and the leach solution in the leach vessel 101 will depend on the composition of the material being leached, the composition and concentration of the initial leach solution and the pregnant leach liquor and similar factors all of which can readily be determined by one skilled in the art. By way of example, when copper clad steel containing 4–5 percent copper is being leached the leach solution advantageously contains approximately 70 grams per liter of copper and has a cupric to cuprous ratio of approximately 9:1, the residence time of the copper-bearing material is about 1 hour, and the pregnant copper ammonium carbonate containing leach liquor contains between about 120–140 g./l. of copper for economical processing.

On completion of the leaching operation pregnant (i.e., copper-rich) leach liquor is withdrawn from the leach vessel 101 through the line 4. Part of the pregnant leach liquor is delivered to the pregnant solution storage tank 103 and the remainder of the liquor is recycled through the line 5 to the oxidizer vessel 102 where lean oxidizing leach solution is reconstituted. Thus, it will be seen that the leach vessel 101 and the oxidizer vessel 102 are connected by lines 4 and 5 and by line 2 to form a closed system through which pregnant leach liquor and reconstituted leach solution circulate.

The copper content of the pregnant leach liquor is predominantly in the form of cuprous ammonium carbonate. If it is desired to convert all or part of the cuprous copper to the cupric form the pregnant leach liquor from the storage tank 103 is delivered through line 7 to the reaction vessel 104 in which the copper content of the liquor is oxidized to obtain the desired proportion of cuprous to cupric copper therein. Alternatively, if it is desired to increase the amount or proportion of cuprous copper in the leach liquor, the liquor is subjected to reduction treatment in the reaction vessel 104 to obtain the desired cuprous/cupric ratio. After this treatment the leach liquor from the reaction vessel 104 is delivered to the first stage reactor 105 through the line 8. Of course, if the pregnant leach liquor does not require this oxidization or reduction treatment, the leach liquor can be delivered to the first stage reactor 105 directly from the storage tank 103.

The pregnant leach liquor is brought into contact with a large volume of hot gases in the first stage reactor 105 advantageously by spraying the liquor into the hot gas stream entering the reactor 105 through the line 9. The hot gases are advantageously at an initial temperature of about 400° to 1,900° F., and preferably about 1,000° F. or above, which causes the water content of the leach liquor to flash evaporate and which further causes the copper ammonium carbonate content of the leach liquor to thermally decompose. The products of this thermal evaporation and decomposition process are a solid particulate material composed essentially of copper oxide and/or copper carbonate and a gaseous mixture of water vapor, ammonia and carbon dioxide.

The degree of decomposition of the copper ammonium carbonate in the reactor 105 depends on the residence time of the solid material in the reactor and the exit temperature of the solids/gas product. For example, at an exit temperature of about 600° F. and a residence time of about 4 seconds the solid product obtained will analyze approximately 85 percent by weight copper while at an exit temperature of about 350° F. and a residence time of about 4 seconds the solid product will analyze about 60 percent by weight copper. Lower exit temperatures result in higher thermal efficiencies but shift a greater proportion of the final decomposition reaction to the second stage reactor. The relative proportions of cuprous to cupric copper in the solid product depends primarily on the cuprous/cupric ratio in the leach liquor. This ratio can be altered to some extent by the use of an oxidizing or reducing atmosphere in the reactor 105.

The decomposition product of the reactor 105 comprising the aforesaid mixture of solid particulate material and gases is delivered to the solids/gas separator 106 through the line 10. The solid/gas separator may be of any conventional type such as a cyclone, an electrostatic precipitator, a baghouse or the like. I presently prefer to use a baghouse solid/gas separator that recovers about 99 percent of the solid particles contained in the solid/gas mixture. As the temperature of the solid/gas product of the reactor 105 is advantageously about 600° F. and as the maximum optimum temperature of operation of the baghouse 106 is about 400° to 450° F., the solid/gas product is advantageously cooled to the latter temperature by means of water sprayed into the line 10.

If the thermal decomposition reaction is carried to essential completion in the reactor 105, the solid product recovered at the solid/gas separator 106 is very finely divided particles of copper oxide and/or copper carbonate of very high purity, and this product can be delivered directly to the solid product storage facility through the line 11. However, for reasons of economy and thermal efficiency the complete decomposition of the copper ammonium carbonate, and in particular the conversion of copper carbonate to copper oxide, is advantageously carried out in two stages. Accordingly, the solid product recovered at the solid/gas separator 106 is delivered through line 12 to the second stage reactor 107 where this particulate material is brought into contact with a further quantity of hot gases to effect substantially complete decomposition of the carbonate to the corresponding copper oxide. The hot gases are advantageously at an initial temperature of 1,000° F. or above, in which case the solid product comprises essentially finely divided particles of copper oxide (typically, about 1.5 microns). If the hot gas is oxidizing in character (e.g., hot air) the solid product will comprise essentially cupric oxide. Conversely, if the hot gas is reducing in character the solid product will comprise essentially cuprous oxide. Strongly reducing gases will produce a finely divided metallic copper product. The resulting mixture of solid particles of oxidic copper an; hot gases is delivered from reactor 107 through line 13 to the solid/gas separator 108. The finely divided particles of high-purity copper, copper oxide and/or copper carbonate recovered in the separator 108 is then delivered to the solid product storage facility through line 14.

In the closed, indirect fired heat exchange system shown in FIG. 1 a portion of the product gases separated from the solid decomposition product in the solid/gas separator 106 is delivered to the reactor gas heater 109 where this gas stream is reheated to the temperature required for evaporation and decomposition of the pregnant leach liquor in the first stage reactor 105. In a typical operation about one-half of the product gas is recycled through the first stage reactor, and in the usual case, this gas is heated from about 400° to about 1,000° F. in the conventional gas heater 109. Fuel and air are introduced into the gas heater 109 through the line 16, and hot combustion gases which may be either oxidizing or reducing in character, depending on combustion procedure, are withdrawn therefrom through the line 17. A portion of the hot combustion gases from the heater 109 are delivered to the second stage reactor 107 through the line 18, the balance of these combustion gases being discharged to the atmosphere. The hot combustion gases delivered to the reaction 107 are, of course, utilized to carry the decomposition of the solid product to substantial completion. Product gases from the separator 106 not recycled to the first stage reactor 105 and product gases from the separator 108 are delivered through line 20 to the gas recovery and leach solution regeneration operations of the process.

Figure 2:
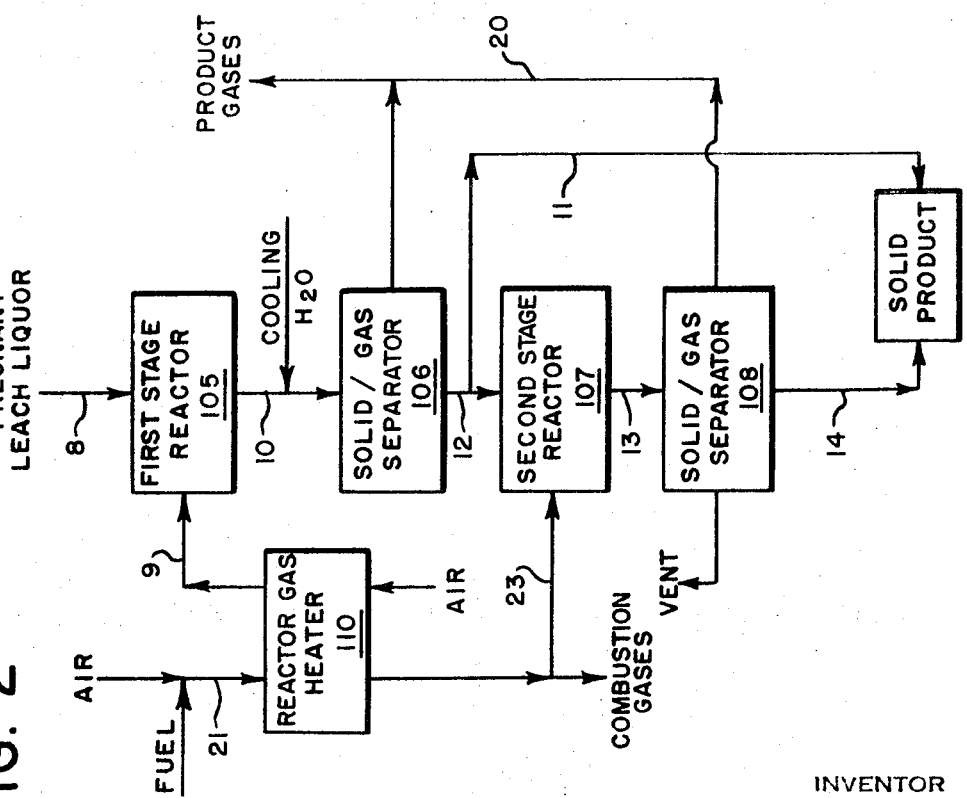
FIG. 2 is a modification of the process shown in FIG. 1 in which air is heated and then employed in the first stage reactor, this modification being referred to as the open, indirect fired, heat exchange system.

In the open, indirect fire heat exchange system shown in FIG. 2 the hot gas utilized in the first stage reactor 105 to effect evaporation and decomposition of the pregnant leach liquor comprises air (or some other extraneous gas) that is introduced into the system and heated to the required temperature (about 1,000° F.) in the reactor gas heater 110. The hot air is then delivered through the line 9 to the first stage reactor 105 where the hot gas dewaters and at least partially decomposes the copper ammonium carbonate content of the leach liquor. As hot air is an oxidizing gas the copper content of the solid product of the decomposition reaction is predominantly in the cupric form.

As before, fuel and air are introduced into the gas heater 110 through line 21, a portion of the hot combustion gases being delivered to the second stage reactor 107 through line 23 to complete the decomposition of the solid product, the remainder of these hot gases being discharged to the atmosphere. The product gases removed from the solid/gas separator 106 will of course, be increased in volume, and the water vapor/ammonia/carbon dioxide content thereof will be diluted, by the introduction of air into the system.

Figure 3:
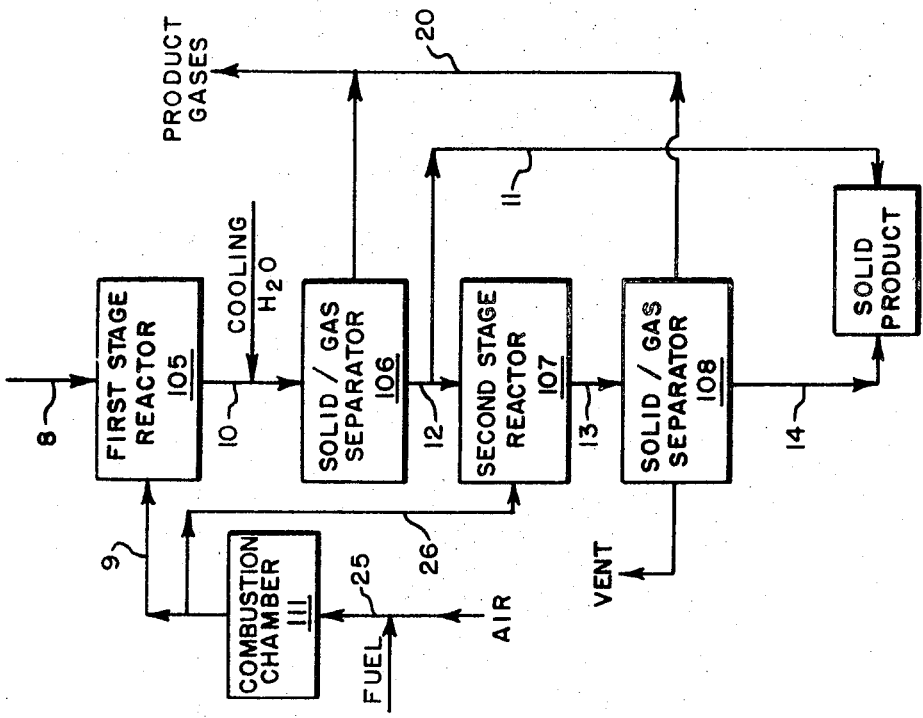
FIG. 3 is a modification of the process shown in FIG. 1 in which hot combustion gases are employed in the first stage reactor, this modification being referred to as the open, direct fired, heat exchange system.

In the open, direct fired, heat exchange system shown in FIG. 3 the hot gas utilized in the first stage reactor 105 to effect evaporation and decomposition of the pregnant leach liquor comprises hot combustion gases from the combustion chamber 111. Fuel and air are introduced into the combustion chamber through line 25, and a portion of the gaseous products of combustion is introduced into the first stage reactor through line 9 to dewater and decompose the leach liquor. The remainder of the combustion gases is delivered to the second stage reactor 107 through the line 26 to complete the decomposition of the solid product in the manner described.

The combined product gases recovered from the solid/gas separator 106 and the solid/gas separator 108 comprise the gaseous products of the thermal decomposition of the pregnant leach liquor ($H_2O$, $NH_3$ and $CO_2$), combustion gases ($H_2O$, $CO_2$, $N_2$, etc.) and, in the case of the heat exchange system shown in FIG. 2, air ($N_2$ and $O_2$). These product gases are recovered in the condenser section of the plant. Advantageously, a two-stage condensing system is employed in order to provide as much flexibility as possible in handling the various gas streams and to supply the stripper and absorber stages of the process with optimum feeds.

The aforementioned product gases from the reactor section are transferred through line 20 to a first stage condenser 113 where part of the gaseous components are condensed. This condensate is then transferred through line 21 to a stripper 114 where the ammonia and carbon dioxide contents of the condensate are removed by way of a vapor overheat stream. The condensate water is removed from the system through the bottom stream to discharge. Excess water enters the system by way of the leach stage wash employed to wash the copper ammonium carbonate leach liquor from the residual solids, by the spray cooling of the product stream used prior to the gas/solids separator stages 106 and 108, and as a constituent of the combustion gases added to the gas stream in the reactor 107. Accordingly, the first stage condenser 113 and the stripper 114 have two main functions, namely, maintaining the water balance in the overall process and the recovery of the ammonia and carbon dioxide components of the first stage condensate.

The gases leaving the first stage condenser 113 enter the second stage condenser 115 through the line 23. The condenser 115 condenses about 90 to 95 percent of the total water remaining in the gas stream, this water carrying along some $NH_3$ and $CO_2$. The condensate from the second stage condenser forms part of the reflux to the absorber tower 116. The effluent gases from the second stage condenser enter the absorber tower 116 through the line 25 where the remaining $H_2O$, $NH_3$ and $CO_2$ components of the gas stream are recovered. To protect against system upsets and the shifting of heat duties from the condensers 113 and 115 to the absorber 116, the absorber is advantageously equipped with an internal heat exchanger so that the absorber is capable of continuous heat exchange with the product stream along with continuous absorption of the ammonia and carbon dioxide content of this stream. The absorber 116 is advantageously a packed tower through which condensate from the condenser 115 percolates countercurrent to the gas stream from this condenser. Makeup streams of $NH_3$ and $CO_2$ are advantageously introduced into the adsorber to makeup for the $NH_3$ and $CO_2$ losses that occur in various sections of the process and by removal of basic copper carbonate products from the system. Noncondensable gases such as $N_2$, $O_2$ and $CO$, uncondensed $H_2O$ and trace amounts of $NH_3$ and $CO_2$ are vented to the atmosphere through line 26. The liquid product stream of the absorber comprises essentially an aqueous solution of ammonia-ammonium carbonate that is delivered to the oxidizer vessel 102 through the line 27.

The oxidizer vessel 102 is a conventional unit for effecting intimate contact between a liquid and a gas and, like the absorber 116, advantageously is a packed tower. As previously mentioned, a portion of the copper-rich pregnant leach liquor from the leach vessel 101 is delivered to the oxidizer vessel 102 to be reconstituted as an additional quantity of lean leach solution. The leach liquor which contains, typically, about 140 g./l. copper predominantly in the form of cuprous ammonium carbonate is mixed with sufficient ammonia-ammonium carbonate solution from the absorber 116 to form a leach solution containing, typically, about 70 g./l. copper. This lean solution is contacted with an oxygen-containing gas in the oxidizer vessel 102 to effect oxidation of most of the cuprous content of the solution to the cupric form in accordance with the equation:

$$Cu_2(NH_3)_4CO_3 + (NH_4)_2CO_3 + 2NH_3 + \tfrac{1}{2}O_2 \rightarrow 2Cu(NH_3)_4CO_3 + H_2O$$

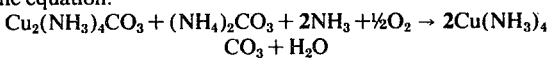

The oxygen-containing gas introduced into the oxidizer vessel 102 through line 28 advantageously contains about 95 percent oxygen together with sufficient ammonia and carbon dioxide to promote the foregoing reaction. The partial pressure of oxygen in the oxidizer vessel 102 is sufficient to insure the oxidation of cuprous copper to cupric copper, and in the preferred practice of the process the oxidation of the leach solution is carried out at an oxygen partial pressure of about 2 to 10 p.s.i., a total system pressure of about 75 p.s.i.g. and a temperature of about 150° F.

The reconstituted lean, oxidized, ammonia and ammonium carbonate containing leach solution is recycled through line 2 to the leaching step of the process where this oxidizing solution leaches the copper-bearing material in accordance with the equations:

$$Cu + Cu(NH_3)_4CO_3 \rightarrow Cu_2(NH_3)_4CO_3; \text{ and}$$
$$2Cu + 2NH_3 + (NH_4)_2CO_3 + \tfrac{1}{2}O_2 \rightarrow Cu_2(NH_3)_4CO_3 + H_2O$$

The leach solution contains a small amount of dissolved oxygen, and this is generally sufficient to leach metallic copper provided the initial leach solution also contains a sufficient quantity of oxidized (cupric) copper to react with all of the metallic copper present in accordance with the foregoing equations. If necessary, however, additional oxygen can be introduced into the leach vessel 101 through line 3 to maintain a partial pressure of oxygen in vessel 101 of at least 2 p.s.i.

The oxygen-containing gas in the oxidizer vessel 102 that is not consumed in the oxidation reaction is recycled to the gas surge tank 117 where additional oxygen, ammonia and/or carbon dioxide is added to the gas to make up for gas consumption and losses. The thus reconstituted gas is then returned, under pressure, to the oxidizer vessel 102.

The process of the invention is an essentially closed system. As a result solvent losses are minimized if not largely eliminated. Moreover, the use of pure oxygen in the oxidizer vessel 102 and in the leach vessel 101 does away with the necessity for a bleed stream (with consequent loss of ammonia) to maintain the desired low level of nitrogen in the system. In addition, the process permits great flexibility in the formation of various end products including very pure cuprous and cupric oxides, carbonates or basic carbonates. From these pure oxidic products other end products such as copper sulfate solutions or pure copper powder can readily be prepared.

The process is useful in the recovery of other metals besides copper. In particular, zinc bearing raw materials (for example, zinc scrap or galvanized steel scrap) can be leached with an oxidizing ammonia-ammonia carbonate with the equation:

$$Zn + 2NH_3 + (NH_4)_2CO_3 + \tfrac{1}{2}O_2 \rightarrow Zn(NH_3)_4CO_3 + H_2O$$

and nickel-bearing raw materials can be leached with this oxidizing leach solution in accordance with the equation:

$$Ni + 2NH_3 + (NH_4)_2CO_3 + \tfrac{1}{2}O_2 \rightarrow Ni(NH_3)_4CO_3 + H_2O$$

In both cases the zinc-bearing aqueous leach liquor and the nickel-bearing aqueous leach liquor are thermally decomposed in the reactors 105 and 107 to produce zinc and nickel oxides or carbonates, and the product gases are treated to reconstitute the lean, oxidizing leach solution in the manner described.

EXAMPLE I

The following example illustrates an embodiment of the process of the invention in which cuprous oxide (1.6 tons per day contained copper) is produced in a closed system with the indirect heat exchange shown in FIG. No. 1.

I. Leach Section 13.5 tons (or approximately one-third of the 24-hour feed requirements) of copper clad steel containing approximately 4 percent copper, the balance iron, is suitably shredded and crushed to form a feed material having an average particle size of ¼×1½ inches. This material is charged into a suitable leaching vessel equipped with a conventional rotary unit. Next, 400 I.G. (imperial gallons) of an aqueous ammonia and cupric ammonium carbonate leaching solution (70 g./l. copper) is fed into the leach vessel and rotated for approximately 1 hour. At the end of this period, with the vessel continuing to rotate, 5.0 I.G./min. of the ammonia and cupric ammonium carbonate leach solution is continuously fed into the leaching vessel while an equal amount of pregnant leach liquor, comprising essentially cuprous ammonium carbonate solution containing 140 g./l. copper, is continuously removed therefrom. At this flow rate, 5.0 I.G./min., the effective residence time of the solution in contact with the copper clad steel feed material is about 60 minutes. Also during this time, the metallic copper is dissolved and the solution is converted from the cupric to cuprous state as previously indicated. The leach vessel is maintained at a pressure of about 40 p.s.i.g., corresponding to the equilibrium leach conditions, and is operated at a leach temperature of about 150° F. The closed system allows the leach to be carried out at an elevated temperature 80° to 250° F. in order to utilize the faster reaction rates and, being closed with respect to the gaseous phase, eliminates solvent vapor losses. This leach operation is continued until about 760 I.G. (total) of solution has been processed through the leach unit or until substantially all of the metallic copper contained in the feed is solubilized as cuprous ammonium carbonate, containing about 1,100 pounds of copper.

The pregnant leach solution, containing approximately 140 g./l. copper, which has been withdrawn from the leach vessel is separated from any entrained solids by a conventional filter or other suitable liquid-solids separator, and the solids are discarded or sent to a processing operation for recovery of any valuable products which may be contained therein. The copper-free steel scrap remaining in the leach vessel is then washed with an aqueous ammonia solution containing between 15 to 25 g./l. of ammonia. The wash solution is then added to the pregnant leach solution, and the copper-free steel is removed from the leach vessel and sent to storage for subsequent processing for recovery of the steel or iron values contained therein.

The filtered, or clarified, pregnant leach solution from the leach vessel is divided into two equal streams. One stream, the product solution, at 140 g./l. copper, is sent to storage at the rate of 2.5 I.G./min. The remaining leach liquor, the recycle leach solution, is blended with an equal amount (2.5 I.G./min.) of fresh ammonia-ammonium carbonate solution (obtained from the absorber) to form a cuprous solution of the following analysis:

| | |
|---|---|
| Cu | 70 g./l. |
| $NH_3$(total) | 140 g./l. |
| $NH_3$(free) | 70 g./l. |
| $CO_2$(total) | 100 g./l. |

This solution is processed in the oxidizing system at the rate of about 5 I.G./min. The oxidizing system consists of a packed tower, operated at about 75 p.s.i., and 150° F., in which the liquid is passed countercurrent to a gaseous oxidizing stream having an inlet composition of:

| | | |
|---|---|---|
| $O_2$ | 92% | |
| $CO_2$ | 3% | mole % on water free |
| $NH_3$ | 5% | basis |

The cuprous ammonium carbonate content of the aqueous solution is oxidized to the cupric state as previously described. The resultant cupric ammonium carbonate containing solution is recycled through the leach vessel to leach additional copper from the fresh copper clad steel feed.

II. Reactor Section

The pregnant leach liquor containing approximately 140 g./l. copper predominately as cuprous ammonium carbonate is pumped from the leach stage into the first stage of the oxide/carbonate reactor at the rate of about 2.5 I.G./min. There the liquor (about 1,460 lbs./hr.) is mixed with 1,200° F. recycle gases (about 5,520 lbs./hr.) to flash evaporate the water content of the liquor and to decompose the cuprous ammonium carbonate content thereof. As a result the weight ratio of recycle gases to feed solution is approximately 3.8/1. while the weight ratio of total gases to the same feed solution is approximately 4.7/1.

The mixing of the liquid feed and recycle gases causes rapid decomposition of the aqueous copper ammonium carbonate solution into a gas/solids mixture as indicated in the following reaction:

$$Cu_2(NH_3)_4CO_3 \xrightarrow[\Delta]{H_2O} Cu_2O + 4NH_3 + CO_2$$

Operation of the first stage of the reactor at about 1,200° F. inlet gas temperature and 600° F. outlet produces a solids (180 lbs./hr.) with the following approximate analysis:

| | |
|---|---|
| Copper | 88.3% (weight %) |
| $NH_3$ $CO_2$ | 1 % |

The resultant hot gas/solids mixture (comprising about 5,520 lbs. of recycle gases/hr., about 1,280 lbs. of product gas/hr. and about 180 lbs. of solids/hr.) is sent to the first stage gas/solids separator comprising a baghouse separator operating at 450° F. (maximum). The gas/solids mixture is cooled from about 600° F. to 400° F. with spray water before entering the baghouse. 99.9+ percent of the total solids, comprising cuprous oxide plus trace amounts of $NH_3$ and $CO_2$, are removed in the first-stage separator. These solids are transferred via the bottom rotary valve of the separator into the second stage oxide/carbonate reactor for final decomposition. The filtered gases (about 6,800 lbs./hr.) from the first-stage gas/solids separator are sent to the recycle blower where the pressure is increased sufficiently (about 2–3 p.s.i.) to maintain the desired flow of recycle gases (5,520 lbs./hr.) to the reactor gas heat exchanger and at the same time discharge a portion of the gases (1,280 lbs./hr.) to the gas recovery section.

The recycle gases enter the indirect fired heat exchanger at approximately 400° F. and are heated to approximately 1,200° F. These gases are then recycled to the first stage oxide/carbonate reactor and mixed with fresh cuprous ammonium carbonate leach liquor, thereby continuing the decomposition reaction cycle.

In the second stage reactor the solids (mostly cuprous oxide at 180 lbs./hr.) are contacted with 2,300 lbs./hr. of combustion gases (at about 1,000° F.) from the indirect-fired reactor gas heat exchanger. The weight ratio of gas to solids in the second stage reactor is approximately 13:1. This gas/solids mixture leaves the second stage reactor at about 850° F. and is cooled with water sprays to approximately 400° F. before entering the second-stage baghouse separator. This solids/gas separator removes approximately 99.9+ percent of the solids from the gas stream and discharges same to storage. The filtered-off gases are sent to a blower where the pressure is boosted (approximately 1–2 p.s.i.) and a portion of the gas (about 10–15 percent) is sent to the gas recovery section. The remaining gas is vented to the atmosphere.

The gases going to the gas recovery section are composed of three main streams, namely, bleed gases from the first stage reactor, bleed gases from the second stage reactor, and miscellaneous vessel and tank vents and purge streams which can be used in the process system where desired or required as will be apparent to those skilled in the art. These gases, at 400° F. and 1,950 lbs./hr., have the following approximate analysis:

| | | |
|---|---|---|
| $H_2O$ | 85.0 | mole % |
| $NH_3$ | 6.1 | mole % |
| $CO_2$ | 2 | mole % |
| $N_2$ | 6.6 | mole % |
| $O_2$ | 0.3 | mole % |

The above gases are cooled to approximately 160° F. in the first stage condenser which condenses approximately 50 percent or 775 lbs./hr. of the water and a portion of the $NH_3$ and $CO_2$ components (15–25 g./l. total). This condensate is sent to the stripper where the $NH_3$ and $CO_2$ components are stripped from the condensate. The stripped condensate (essentially water) is discarded and the $NH_3$ and $CO_2$ components are delivered to the adsorber for recovery.

The uncondensed gases from the first-stage condenser enter the second-stage condenser and are cooled to approximately 90° F., whereby most of the remaining water is condensed (about 775 lbs./hr.). This condensate which also contains some $NH_3$ and $CO_2$ components (10–15 g./l.), is sent to the absorber where it is used as reflux feed to reabsorb $NH_3$ and $CO_2$ contained in the gas received from the stripper and in the remaining uncondensed gas received from the second stage condenser. In the absorber the $NH_3$ and $CO_2$ components from the stripper and the $NH_3$ and $CO_2$ components from the second-stage condenser are intimately contacted with reflux liquid to reconstitute the ammonia-ammonium carbonate solution delivered to the leach solution oxidizer vessel. The absorber bottoms (about 1,280 lbs./hr.) recycled to the leach section for additional copper extraction has the following approximate analysis:

| | |
|---|---|
| $NH_3$(combined) | 43 lb./hr. |
| $NH_3$(free) | 43 lb./hr. |
| $CO_2$ | 56 lb./hr. |
| $H_2O$ | 1,140 lb./hr. |

The absorber vent gases (204 lbs./hr.) has the following approximate analysis:

| | |
|---|---|
| $N_2$ | 186 lb./hr. |
| $NH_3$ $CO_2$ | Trace |
| $O_2$ | 10 lb./hr. |
| $H_2O$ | 8 lb./hr. |

EXAMPLE 2

Zinc oxide of very high purity is prepared by leaching a zinc clad steel raw material with an oxidizing ammonia-ammonium carbonate leach solution and preceding thereafter in the manner described in Example 1.

EXAMPLE 3

Nickel oxide of very high purity is prepared by leaching a nickel clad steel raw material with an oxidizing ammonia-ammonium carbonate leach solution and preceding thereafter in the manner described in Example 1.

I claim:

1. A process for producing a high-purity metal oxide of the group consisting of copper, zinc and nickel oxides from impure metallic materials containing one of said metals in elemental form which comprises:

leaching the metallic material with an oxidizing aqueous leach solution containing ammonia-ammonium carbonate at an elevated temperature to obtain an aqueous leach liquor containing the metal ammonium carbonate salt of said metal, separating the metal ammonium carbonate containing leach liquor from the insoluble residue of the leaching step, contacting the thus separated aqueous leach liquor with hot gases in a first reaction zone at a temperature of between about 400° to 1,900° F. to evaporate the water content and to thermally decompose the metal ammonium carbonate content of the leach liquor to obtain a gas/solids mixture of gaseous water vapor, ammonia and carbon dioxide and solid metal carbonates and metal oxides, separating the solid metal carbonate and oxides from the gaseous products of the decomposition reaction, contacting the thus separated metal carbonates and oxides with hot gases in a second reaction zone at a temperature of between about 400° to 1,900° F. to thermally decompose the metal carbonate to obtain the corresponding metal oxide, the reduction and oxidation properties of said hot gases being controlled to produce a substantially pure metal oxide product of a predetermined oxygen content, separating the solid metal oxide product from the gaseous products of the decomposition reaction, condensing and absorbing the gaseous products and recycling the resulting ammonia-ammonium carbonate solution to the leaching step of the process, and recovering the solid metal oxide product of the process.

2. The process of claim 1 in which the oxidizing leach solution contains the metal ammonium carbonate of the metal being dissolved.

3. The process of claim 1 in which a portion of the aqueous leach liquor is mixed with the reconstituted ammonia-ammonium carbonate solution, and in which this ammoniacal metal ammonium carbonate solution is used as the leach solution.

4. The process of claim 1 in which the leaching operation is carried out at a temperature of at least 100° F. and under a partial pressure of oxygen of at least 2 p.s.i.

5. The process of claim 1 in which the leach liquor is contacted with a gas at a temperature of at least 1,000° F.

6. The process of claim 1 in which a portion of the gaseous product of the decomposition reaction is reheated to at least 1,000° F. and is recycled to the decomposition step to serve as the hot gas.

7. A process for producing high-purity copper oxide from elemental copper-bearing materials which comprises:

leaching the copper-bearing material with an ammonium carbonate containing ammoniacal aqueous leach solution at a temperature of at least about 100° F. under a partial pressure of oxygen of at least about 2 p.s.i. to obtain a substantially iron-free copper-containing aqueous leach liquor, separating the copper-containing aqueous leach liquor from the insoluble residue of the leaching step, contacting the thus separated copper-containing aqueous leach liquor with hot gases at a temperature of between about 400° to 1,900° F. to decompose the copper ammonia carbonate to form ammonia, carbon dioxide and steam and to form solid copper oxide and copper carbonates, separating the copper carbonate and copper oxide from the gases, contacting the thus separated copper carbonates and oxides with hot gases in a second reaction zone at a temperature of between about 400° to 1,900° F. to thermally decompose the copper carbonate to obtain the corresponding copper oxide, the reduction and oxidation properties of said hot gases being controlled to produce a substantially pure copper oxide product of a predetermined oxygen content, separating the solid metal oxide product from the gaseous products of the decomposition reaction, condensing and absorbing the gaseous products and recycling the resulting ammonia-ammonium carbonate solution to the leaching step of the process, and recovering the high-purity copper oxide product.

8. The process of claim 7 in which the high-purity copper oxide product is contacted with high-purity sulfuric acid to produce high-purity copper sulfate.

9. The process of claim 7 in which the high-purity copper oxide is contacted with a reducing gas to produce a high-purity copper powder.

10. The process of claim 7 in which the gases used to thermally decompose the copper leach solution are a portion of the recycle gases resulting from the decomposition of the aqueous copper ammonium carbonate.

11. The process of claim 7 in which the leaching of the copper-bearing material is carried out at a temperature of between about 80° and 250° F.

12. The process of claim 7 in which the leaching of the copper-bearing material is carried out at a partial pressure of oxygen of from about 2 to 10 p.s.i.

13. The process of claim 7 in which part of the aqueous leach liquor of reduced copper content from the liquid decomposition is condensed and recycled to the leaching step of the process.

14. The process of claim 7 in which the decomposition of the copper-containing aqueous leach liquid is carried out using air at about 400° F.

15. The process of claim 7 in which the decomposition of the copper-containing aqueous leach liquid is carried out using the combustion products from a direct gas fired heater at about 400° F.

16. The process of claim 15 in which the decomposition of the copper containing aqueous leach liquid is carried out at a combustion products inlet temperature of between 400° and 1,900° F.

* * * * *